(12) United States Patent
Maruyama et al.

(10) Patent No.: US 11,215,206 B2
(45) Date of Patent: *Jan. 4, 2022

(54) HYDRAULIC SYSTEM OF INDUSTRIAL VEHICLE

(71) Applicant: KABUSHIKI KAISHA TOYOTA JIDOSHOKKI, Kariya (JP)

(72) Inventors: Daisuke Maruyama, Aichi-ken (JP); Tomoya Sato, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/036,518

(22) Filed: Sep. 29, 2020

(65) Prior Publication Data

US 2021/0102563 A1 Apr. 8, 2021

(30) Foreign Application Priority Data

Oct. 4, 2019 (JP) .............................. JP2019-183618

(51) Int. Cl.
*F15B 21/0423* (2019.01)
*B60T 13/14* (2006.01)

(52) U.S. Cl.
CPC .......... *F15B 21/0423* (2019.01); *B60T 13/14* (2013.01)

(58) Field of Classification Search
CPC .............. F15B 21/0423; F15B 2211/62; F15B 2211/66
See application file for complete search history.

(56) References Cited

U.S. PATENT DOCUMENTS 10,006,188 B2* 6/2018 Fukuda ................... B60T 11/28
10,829,118 B2* 11/2020 Maruyama ............ B60T 13/662
10,948,039 B2* 3/2021 Yamamoto ................ B66F 9/22

FOREIGN PATENT DOCUMENTS

| JP | 58-113577 U | 8/1983 |
|----|-------------|--------|
| JP | 07-069202 A | 3/1995 |
| JP | 2006-264417 A | 10/2006 |
| JP | 2013-124693 A | 6/2013 |
| JP | 2014-055608 A | 3/2014 |

* cited by examiner

*Primary Examiner* — F Daniel Lopez
(74) *Attorney, Agent, or Firm* — Sughrue Mion, PLLC

(57) ABSTRACT

A hydraulic system of an industrial vehicle includes an oil tank in which hydraulic oil is retained; a hydraulic pump that draws in the hydraulic oil from the tank and supply the oil to a loading actuator and a brake unit; a brake valve that controls the hydraulic oil to be supplied to the brake unit according to an operation of a brake operation tool; a hydraulic oil cooler that cools the hydraulic oil; a cooling passage that allows the hydraulic oil to flow toward the cooler and further allows the oil cooled in the cooler to flow toward the brake unit; and a switching valve that switches between a first oil passage that cuts off a supply of the hydraulic oil from the hydraulic pump to the cooling passage and a second oil passage that allows the supply of the hydraulic oil from the hydraulic pump to the cooling passage.

5 Claims, 8 Drawing Sheets

HYDRAULIC SYSTEM OF INDUSTRIAL VEHICLE

This application claims priority to Japanese Patent Application No. 2019-183618 filed on Oct. 4, 2019, the entire disclosure of which is incorporated herein by reference.

The present disclosure relates to a hydraulic system of an industrial vehicle.

BACKGROUND ART

Japanese Patent Application Publication No. 2006-264417 discloses a known hydraulic system of an industrial vehicle, for example. The hydraulic system disclosed in Japanese Patent Application Publication No. 2006-264417 includes a hydraulic pump for a brake and a hydraulic pump for an operating machine that are driven by an engine, a wheel cylinder that is driven by hydraulic oil discharged from the hydraulic pump for a brake, a brake operation valve disposed between the hydraulic pump for a brake and the wheel cylinder and provided with a brake pedal, an accumulator connected to a pipe that branches off from a pipe connected to the hydraulic pump for a brake, a cylinder for an operating machine that is driven by hydraulic oil discharged from the hydraulic pump for an operating machine, and an operating-machine operation valve disposed between the hydraulic pump for an operating machine and the cylinder for an operating machine.

The above-described hydraulic system may include a hydraulic oil cooler configured to cool hydraulic oil for cooling a brake unit, and may supply the hydraulic oil, which has been cooled in the hydraulic oil cooler, to the brake unit. In this case, the hydraulic system needs a dedicated hydraulic pump and oil tank for the cooling of the brake unit in addition to the hydraulic oil cooler. This configuration causes an increase in the number of necessary components of the hydraulic system and a mounting space for those components, which leads to an increase in size of the industrial vehicle to which the hydraulic system is mounted.

The present disclosure, which has been made in light of the above-mentioned problem, is directed to providing a hydraulic system of an industrial vehicle that allows the number of components and a mounting space for the components to be reduced.

SUMMARY

In accordance with one aspect of the present disclosure, there is provided a hydraulic system of an industrial vehicle that includes a loading actuator and a brake unit that are driven by hydraulic oil. The hydraulic system of an industrial vehicle further includes an oil tank in which the hydraulic oil is retained; a first hydraulic pump and a second hydraulic pump, each configured to draw in the hydraulic oil from the oil tank, wherein the first hydraulic pump is configured to supply the hydraulic oil to the loading actuator and the second hydraulic pump is configured to supply the hydraulic oil to the brake unit; a control valve configured to control the hydraulic oil supplied from the first hydraulic pump to the loading actuator; a brake valve configured to control the hydraulic oil to be supplied to the brake unit according to an operation of a brake operation tool; a hydraulic oil cooler configured to cool the hydraulic oil; a cooling passage that allows the hydraulic oil to flow from the hydraulic oil cooler to the brake unit; and a switching valve configured to switch between a first oil passage so as to cut off a supply of the hydraulic oil from the hydraulic pump to the hydraulic oil cooler and a second oil passage so as to allow the supply of the hydraulic oil from the second hydraulic pump to the cooling passage.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The present disclosure together with objects and advantages thereof, may best be understood by reference to the following description of the presently preferred embodiments together with the accompanying drawings in which.

DETAILED DESCRIPTION OF THE EMBODIMENTS

Figure 1:
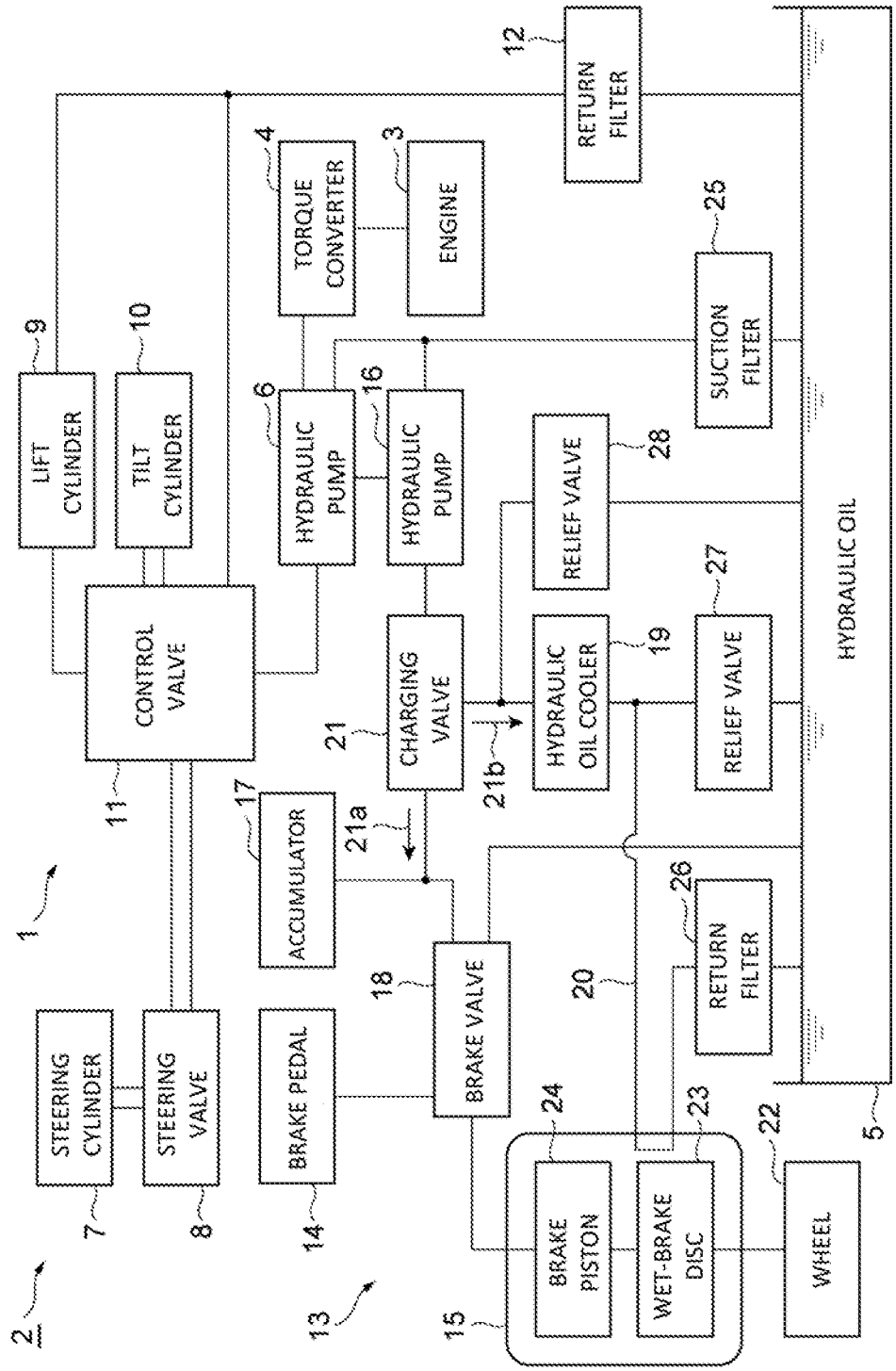
FIG. 1 is a schematic configuration diagram of a hydraulic system of an industrial vehicle according to a first embodiment of the present disclosure.

The following will describe embodiments of the present disclosure in detail with reference to the accompanying drawings. It is to be noted that, in the drawings, the same or substantially equal components are designated by the same reference numerals and will not be further elaborated.

FIG. 1 is a schematic configuration diagram of a hydraulic system of an industrial vehicle according to a first embodiment of the present disclosure. In FIG. 1, a hydraulic system 1 of this embodiment is mounted to a forklift truck 2 that serves as an industrial vehicle. The forklift truck 2 includes an engine 3 and a torque converter 4 that is attached to an output shaft of the engine 3.

The hydraulic system 1 includes an oil tank 5, a hydraulic pump 6, a steering cylinder 7, a steering valve 8, a lift cylinder 9, a tilt cylinder 10, and a control valve 11.

The oil tank 5 is configured to retain hydraulic oil. The hydraulic pump 6 is driven by the engine 3 via the torque converter 4. The hydraulic pump 6 is configured to draw in the hydraulic oil retained in the oil tank 5 and discharge it.

The steering cylinder 7 is driven by the hydraulic oil discharged from the hydraulic pump 6 to assist an operator to steer the industrial vehicle. The steering valve 8 is disposed between the hydraulic pump 6 and the steering cylinder 7, and configured to change the flow direction of the hydraulic oil according to a steering direction of the steering wheel (not shown).

The lift cylinder 9 and the tilt cylinder 10 serve as a loading actuator that is driven by the hydraulic oil discharged from the hydraulic pump 6. The lift cylinder 9 is configured to lift a fork (not shown). The tilt cylinder 10 is configured to tilt a mast (not shown).

The control valve 11 is configured to control the hydraulic oil that is supplied from the hydraulic pump 6 to the lift cylinder 9 and the tilt cylinder 10. Specifically, the control valve 11 controls the flow direction and the flow rate of the hydraulic oil flowing from the hydraulic pump 6 to the lift cylinder 9 according to an operational direction and an operational amount of a lift lever (not shown). The control valve 11 is configured to control the flow direction and the flow rate of the hydraulic oil flowing from the hydraulic pump 6 to the tilt cylinder 10 according to an operational direction and an operational amount of a tilt lever (not shown). A return filter 12 is disposed in a flow passage between the lift cylinder 9 and the control valve 11 and the oil tank 5.

The hydraulic system 1 further includes a brake system 13 that is configured to apply a brake to the forklift truck 2. The brake system 13 includes a brake pedal 14, a wet-brake unit 15, a hydraulic pump 16, an accumulator 17, a brake valve 18, a hydraulic oil cooler 19, a cooling passage 20, and a charging valve 21.

The brake pedal 14 is a brake operation tool that is pressed by the operator for applying a brake. The wet-brake unit 15 includes a wet-brake disc 23 that is configured to apply a brake to a wheel 22 of the forklift truck 2, and a brake piston 24 that is configured to press the wet-brake disc 23. The brake piston 24 is driven by the hydraulic oil.

The hydraulic pump 16 is disposed coaxially with the hydraulic pump 6, and driven by the engine 3 via the torque converter 4. The hydraulic pump 16 is configured to draw in the hydraulic oil retained in the oil tank 5 and discharge it. A suction filter 25 is disposed in a flow passage between the oil tank 5 and the hydraulic pumps 6, 16 to prevent foreign substances, such as dust, from entering the hydraulic pumps 6, 16.

The accumulator 17 is configured to accumulate the hydraulic oil discharged from the hydraulic pump 16. The brake valve 18 is disposed between the accumulator 17 and the brake piston 24. The brake valve 18 is configured to control the hydraulic oil that is supplied from the accumulator 17 to the brake piston 24 according to the operation of the brake pedal 14. Specifically, the brake valve 18 controls the flow rate and the pressure of the hydraulic oil that is supplied from the accumulator 17 to the brake piston 24 according to the operational amount of the brake pedal 14.

Figure 2:
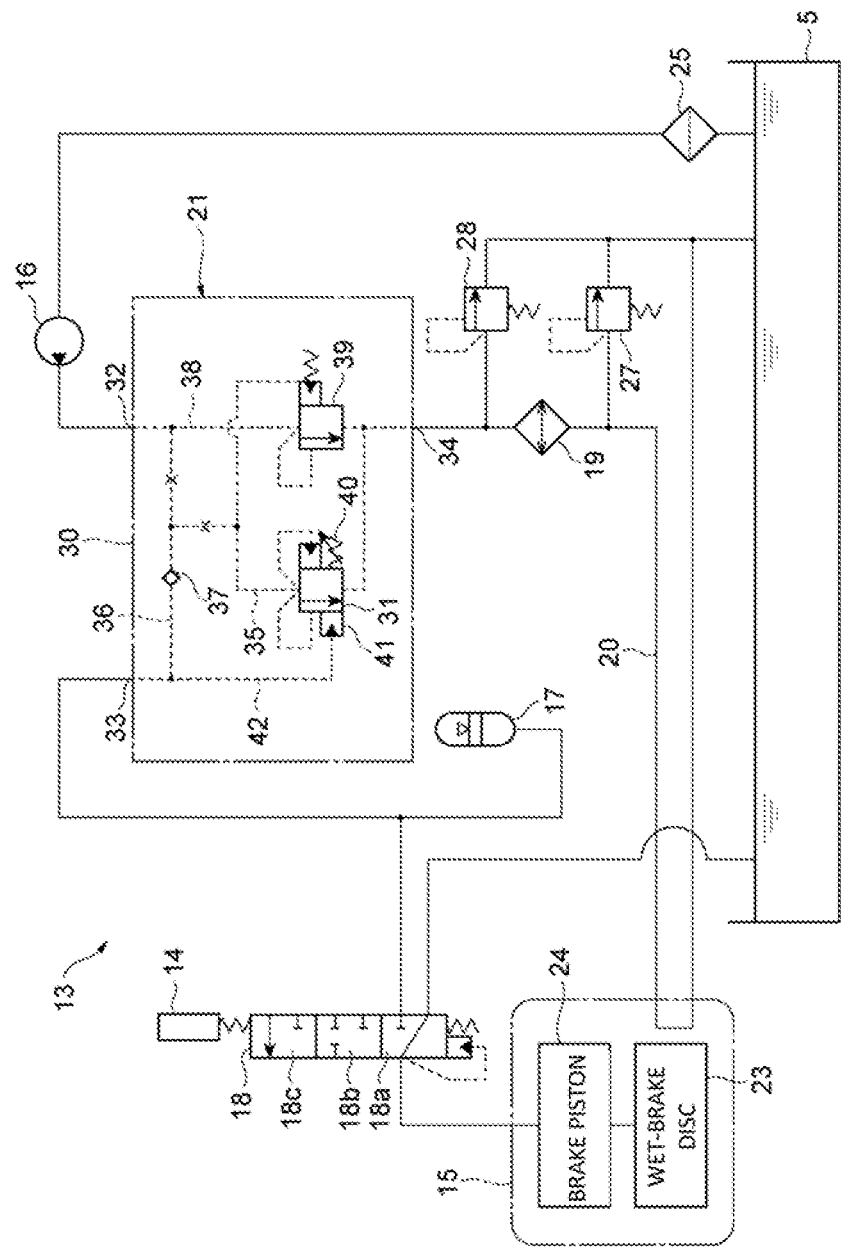
FIG. 2 is a hydraulic circuit diagram of the hydraulic system including a brake valve and a charging valve illustrated in FIG. 1.

The brake valve 18 is a closed valve as illustrated in FIG. 2. The brake valve 18 is configured to switch between an unloading position 18a, a neutral position 18b, and a braking position 18c.

The unloading position 18a is a position where the brake valve 18 allows a communication between the oil tank 5 and the brake piston 24 and cuts off a communication between the accumulator 17 and the brake piston 24. The neutral position 18b is a position where the brake valve 18 cuts off the communication between the accumulator 17 and the oil tank 5 and the brake piston 24. The braking position 18c is a position where the brake valve 18 allows the communication between the accumulator 17 and the brake piston 24 and cuts off the communication between the oil tank 5 and the brake piston 24.

When the brake pedal 14 is not pressed, the brake valve 18 is in the unloading position 18a. When the brake pedal 14 is pressed, the brake valve 18 is switched from the unloading position 18a to the neutral position 18b or the braking position 18c according to the pressing amount of the brake pedal 14. When the pressing amount of the brake pedal 14 is normal, the brake valve 18 is switched to the braking position 18c.

The hydraulic oil cooler 19 is configured to cool the hydraulic oil discharged from the hydraulic pump 16. The cooling passage 20 connects the charging valve 21 and the oil tank 5 via the wet-brake unit 15. The cooling passage 20 allows the hydraulic oil to flow from the hydraulic pump 16 toward the hydraulic oil cooler 19 and further allows the hydraulic oil cooled in the hydraulic oil cooler 19 to flow toward the wet-brake unit 15. The hydraulic oil cooler 19 is disposed between the charging valve 21 and the wet-brake unit 15 in the cooling passage 20. The hydraulic oil cooled in the hydraulic oil cooler 19 is supplied to the wet-brake unit 15 to cool the wet-brake disc 23. The hydraulic oil returns to the oil tank 5 after cooling the wet-brake disc 23.

In the cooling passage 20, a return filter 26 is disposed between the wet-brake unit 15 and the oil tank 5. Further, a relief valve 27 is disposed in a flow passage between the hydraulic oil cooler 19 and the oil tank 5. A relief valve 28 is disposed in a flow passage connecting the oil tank 5 with a part of the cooling passage 20 between the charging valve 21 and the hydraulic oil cooler 19.

The charging valve 21 is disposed between the hydraulic pump 16, the wet-brake unit 15, and the accumulator 17. The charging valve 21 is a switching valve that is configured to switch between an accumulation oil passage 21a and a to cooling oil passage 21b. The accumulation oil passage 21a serves as a first oil passage that allows a supply of the hydraulic oil from the hydraulic pump 16 to the accumulator 17, and cuts off a supply of the hydraulic oil from the hydraulic pump 16 to the cooling passage 20. The cooling oil passage 21b serves as a second oil passage that allows the supply of the hydraulic oil from the hydraulic pump 16 to the cooling passage 20 when the pressure in the accumulator 17 is equal to or higher than a set pressure value. The set pressure is, for example, a pressure enough to fill the accumulator 17 with the hydraulic oil.

The charging valve 21 includes a housing 30 and a spool 31 that is disposed in the housing 30, as illustrated in FIG. 2. The housing 30 has a pump port 32 to which the hydraulic pump 16 is connected, an accumulator port 33 (ACC port 33) to which the accumulator 17 is connected, and a cooler port 34 to which the hydraulic oil cooler 19 is connected.

The pump port 32 is connected to the cooler port 34 via a flow passage 35. The spool 31 is disposed in the flow passage 35. The ACC port 33 is connected to a part of the flow passage 35 between the pump port 32 and the spool 31 via a flow passage 36. A check valve 37 is disposed in the flow passage 36 and allows the flow of the hydraulic oil from the pump port 32 to the ACC port 33 only. The pump port 32 is connected to the cooler port 34 via a flow passage 38. A relief valve 39 is disposed in the flow passage 38 and opens when the pressure in the pump port 32 is excessively high.

The spool 31 switches between an open position and a close position depending on the pressure in the ACC port 33 (the pressure in the accumulator 17). The spool 31 has a spring 40 at one end of the spool 31. The spool 31 further has a pilot operator 41 at the other end of the spool 31. The pilot operator 41 is connected to the ACC port 33 via a pilot line 42. The pilot line 42 receives a pilot pressure that corresponds to the pressure in the accumulator 17.

When the pilot pressure is equal to or lower than an urging force provided by the spring 40, the spool 31 is in the close position (as illustrated in FIG. 2) and cuts off the flow of the hydraulic oil from the pump port 32 to the cooler port 34.

Accordingly, the hydraulic oil discharged from the hydraulic pump 16 is not supplied to the hydraulic oil cooler 19, but supplied to the accumulator 17 only. When the pilot pressure becomes greater than the urging force provided by the spring 40, the spool 31 is switched from the close position to the open position and allows the flow of the hydraulic oil from the pump port 32 to the cooler port 34. Accordingly, the hydraulic oil discharged from the hydraulic pump 16 is supplied to the accumulator 17 and the hydraulic oil cooler 19. The hydraulic oil discharged from the hydraulic pump 16 is supplied preferentially to the accumulator 17. Further, excess hydraulic oil, which is not supplied to the accumulator 17, is supplied to the hydraulic oil cooler 19.

In the hydraulic system 1 including the above-described brake system 13, the charging valve 21 switches to the accumulation oil passage 21a (the oil passage on the ACC port 33 side) when the pressure in the accumulator 17 is equal to or lower than the set pressure value. Accordingly, the hydraulic oil discharged from the hydraulic pump 16 is supplied to the accumulator 17 via the charging valve 21 and accumulated in the accumulator 17.

When the pressure in the accumulator 17 becomes higher than the set pressure value, the charging valve 21 switches from the accumulation oil passage 21a to the cooling oil passage 21b (the oil passage on the cooler port 34 side). The hydraulic oil discharged from the hydraulic pump 16 is supplied preferentially to the accumulator 17. After the accumulation of the hydraulic oil in the accumulator 17 is completed, the hydraulic oil discharged from the hydraulic pump 16 is supplied to the hydraulic oil cooler 19 via the charging valve 21.

When the brake pedal 14 is pressed in this case, the brake valve 18 is switched from the unloading position 18a to the braking position 18c to supply the hydraulic oil accumulated in the accumulator 17 to the brake piston 24 so that the wet-brake disc 23 applies a brake to the wheel 22. The hydraulic oil cooled in the hydraulic oil cooler 19 is supplied to the wet-brake unit 15 through the cooling passage 20 to cool the wet-brake disc 23.

The hydraulic oil accumulated in the accumulator 17 is consumed for the use of the wet-brake unit 15, which leads to a decrease in the pressure in the accumulator 17. When the pressure in the accumulator 17 becomes equal to or lower than the set pressure value, the charging valve 21 switches from the cooling oil passage 21b to the accumulation oil passage 21a, so that the hydraulic oil is accumulated in the accumulator 17 again.

Figure 3:
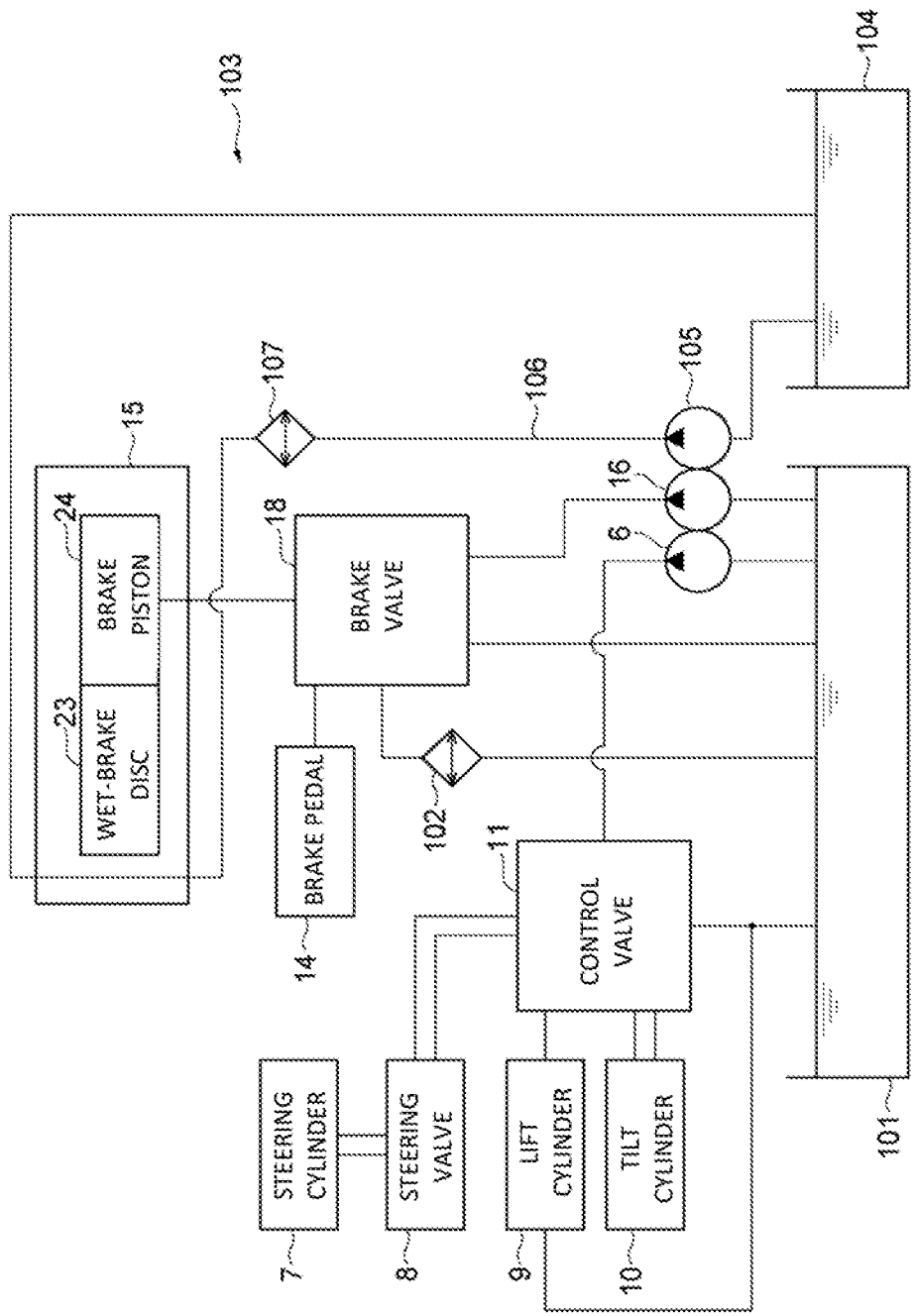
FIG. 3 is a schematic configuration diagram of a hydraulic system of an industrial vehicle as a comparative example.

FIG. 3 is a schematic configuration diagram of a hydraulic system of an industrial vehicle as a comparative example. As illustrated in FIG. 3, a hydraulic system 100 of the comparative example includes the hydraulic pump 6, the steering cylinder 7, the steering valve 8, the lift cylinder 9, the tilt cylinder 10, the control valve 11, the brake pedal 14, the wet-brake unit 15, the hydraulic pump 16, the brake valve 18, and a main oil tank 101. The hydraulic system 100 further includes a hydraulic oil cooler 102 that is disposed in a flow passage between the brake valve 18 and the main oil tank 101.

Additionally, the hydraulic system 100 further includes a cooling unit 103 that is configured to cool the wet-brake unit 15. The cooling unit 103 includes a cooling oil tank 104, a cooling hydraulic pump 105, a cooling passage 106, and a hydraulic oil cooler 107.

The cooling hydraulic pump 105 is configured to draw in the hydraulic oil retained in the cooling oil tank 104 and discharge it. The cooling passage 106 connects the cooling hydraulic pump 105 and the cooling oil tank 104 via the wet-brake unit 15. The hydraulic oil cooler 107 is disposed in the cooling passage 106 and configured to cool the hydraulic oil discharged from the cooling hydraulic pump 105. The hydraulic oil cooled in the hydraulic oil cooler 107 is supplied to the wet-brake unit 15 to cool the wet-brake disc 23.

However, the hydraulic system 100 of this comparative example needs the cooling oil tank 104, the cooling hydraulic pump 105, and the hydraulic oil cooler 107 dedicated for the cooling of the wet-brake unit 15. Particularly, the cooling oil tank 104 is large. This causes an increase in the number of necessary components of the hydraulic system 100 and a mounting space for those components, which leads to an increase in size of a forklift truck to which the hydraulic system 100 is mounted.

In contrast, in this embodiment, when the brake pedal 14 is pressed, the brake valve 18 allows the supply of the hydraulic oil to the wet-brake unit 15 to operate the wet-brake unit 15. When the charging valve 21 switches to the cooling oil passage 21b, the hydraulic oil discharged from the hydraulic pump 16 is supplied to the cooling passage 20. The hydraulic oil cooled in the hydraulic oil cooler 19 is supplied, through the cooling passage 20, to the wet-brake unit 15 and cools the wet-brake unit 15. Providing the charging valve 21 eliminates the need for the dedicated cooling oil tank 104 and cooling hydraulic pump 105, thereby allowing the oil tank 5 to be used as a common oil tank and minimizing the number of hydraulic pumps to a bare minimum. This configuration also eliminates the need for the hydraulic oil cooler 102. Accordingly, this configuration reduces the number of components of the hydraulic system 1 and the mounting space for those components. As a result, this configuration allows the forklift truck 2 to be compact.

Further, in this embodiment, when the pressure in the accumulator 17 is lower than the set pressure value, the charging valve 21 switches to the accumulation oil passage 21a to cause the hydraulic oil discharged from the hydraulic pump 16 to be accumulated in the accumulator 17. When the pressure in the accumulator 17 becomes equal to or higher than the set pressure value, the charging valve 21 switches to the cooling oil passage 21b to complete the accumulation of the hydraulic oil in the accumulator 17. When the brake pedal 14 is pressed, the brake valve 18 allows the supply of the hydraulic oil from the accumulator 17 to the wet-brake unit 15 to operate the wet-brake unit 15. The use to of the accumulator 17 reduces the load on the hydraulic pump 16.

In this embodiment, the hydraulic oil cooler 19 is disposed between the charging valve 21 and the wet-brake unit 15 in the cooling passage 20. Accordingly, the hydraulic oil is supplied to the wet-brake unit 15 immediately after the hydraulic oil is cooled in the hydraulic oil cooler 19, so that the wet-brake unit 15 is cooled efficiently.

Figure 4:
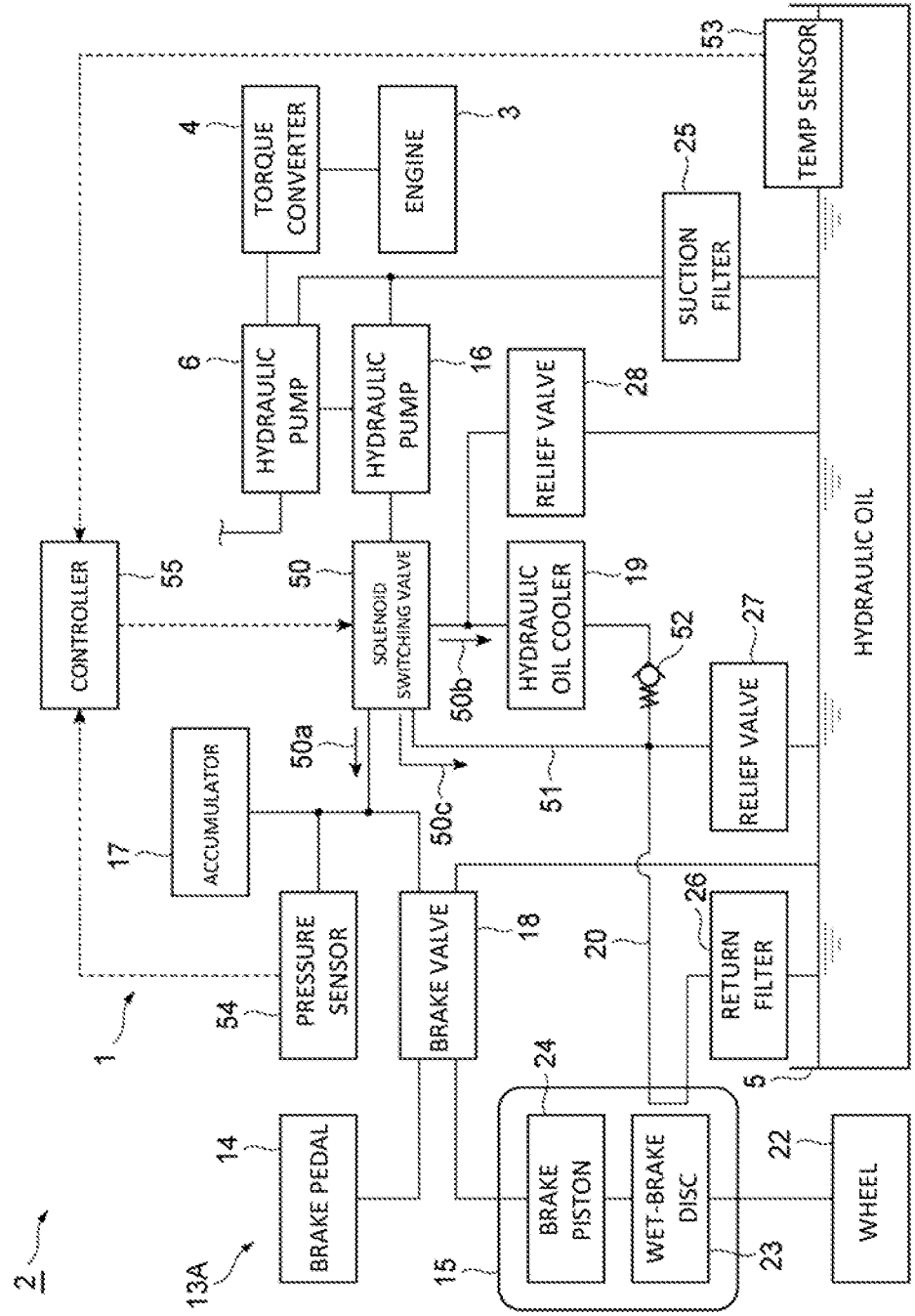
FIG. 4 is a schematic configuration diagram of a hydraulic system of an industrial vehicle according to a second embodiment of the present disclosure.

FIG. 4 is a schematic configuration diagram of a hydraulic system of an industrial vehicle according to a second embodiment of the present disclosure. As illustrated in FIG. 4, the hydraulic system 1 of this embodiment includes a brake system 13A. The brake system 13A includes a solenoid switching valve 50, instead of the charging valve 21 of the first embodiment.

The brake system 13A has a detour-flow passage 51 that connects the solenoid switching valve 50 to a part of the cooling passage 20 between the hydraulic oil cooler 19 and the wet-brake unit 15 and detours around the hydraulic oil cooler 19. Between the hydraulic oil cooler 19 and the detour-flow passage 51 in the cooling passage 20, a check valve 52 is disposed to allow the flow of the hydraulic oil from the hydraulic oil cooler 19 side to the wet-brake unit 15 side only.

The solenoid switching valve 50 is disposed between the hydraulic pump 16, the wet-brake unit 15, and the accumulator 17. The solenoid switching valve 50 is a three-way valve that is configured to switch between three ways such as an accumulation oil passage 50a, a cooler-through-oil passage 50b, and a cooler-detour-oil passage 50c.

The accumulation oil passage 50a serves as a first oil passage that allows the supply of the hydraulic oil from the hydraulic pump 16 to the accumulator 17 and cuts off the supply of the hydraulic oil from the hydraulic pump 16 to the hydraulic oil cooler 19 and the detour-flow passage 51. That is, the accumulation oil passage 50a is an oil passage that cuts off the supply of the hydraulic oil from to the hydraulic pump 16 to the cooling passage 20.

The cooler-through-oil passage 50b serves as a second oil passage that allows the supply of the hydraulic oil from the hydraulic pump 16 to the hydraulic oil cooler 19 and cuts off the supply of the hydraulic oil from the hydraulic pump 16 to the accumulator 17 and the detour-flow passage 51. That is, the cooler-through-oil passage 50b is an oil passage that allows the supply of the hydraulic oil from the hydraulic pump 16 to the cooling passage 20.

The cooler-detour-oil passage 50c serves as an oil passage that allows the supply of the hydraulic oil from the hydraulic pump 16 to the detour-flow passage 51 and cuts off the supply of the hydraulic oil from the hydraulic pump 16 to the accumulator 17 and the hydraulic oil cooler 19.

The brake system 13A further includes a temperature sensor 53, a pressure sensor 54, and a controller 55.

The temperature sensor 53 serves as a temperature detector that is configured to detect the temperature of the hydraulic oil retained in the oil tank 5. The temperature sensor 53 is, for example, a thermocouple sensor. The temperature sensor 53 may detect the temperature of the hydraulic oil that flows through a flow passage connected to the oil tank 5. The pressure sensor 54 serves as a pressure detector that is configured to detect the pressure in the accumulator 17.

The controller 55 includes a central processing unit (CPU), a random access memory (RAM), a read-only memory (ROM), and input/output interfaces. The controller 55 serves as a controller that is configured to control the solenoid switching valve 50 based on the detection values (a temperature of the hydraulic oil in the oil tank 5 and a pressure in the accumulator 17) detected by the temperature sensor 53 and the pressure sensor 54.

Figure 5:
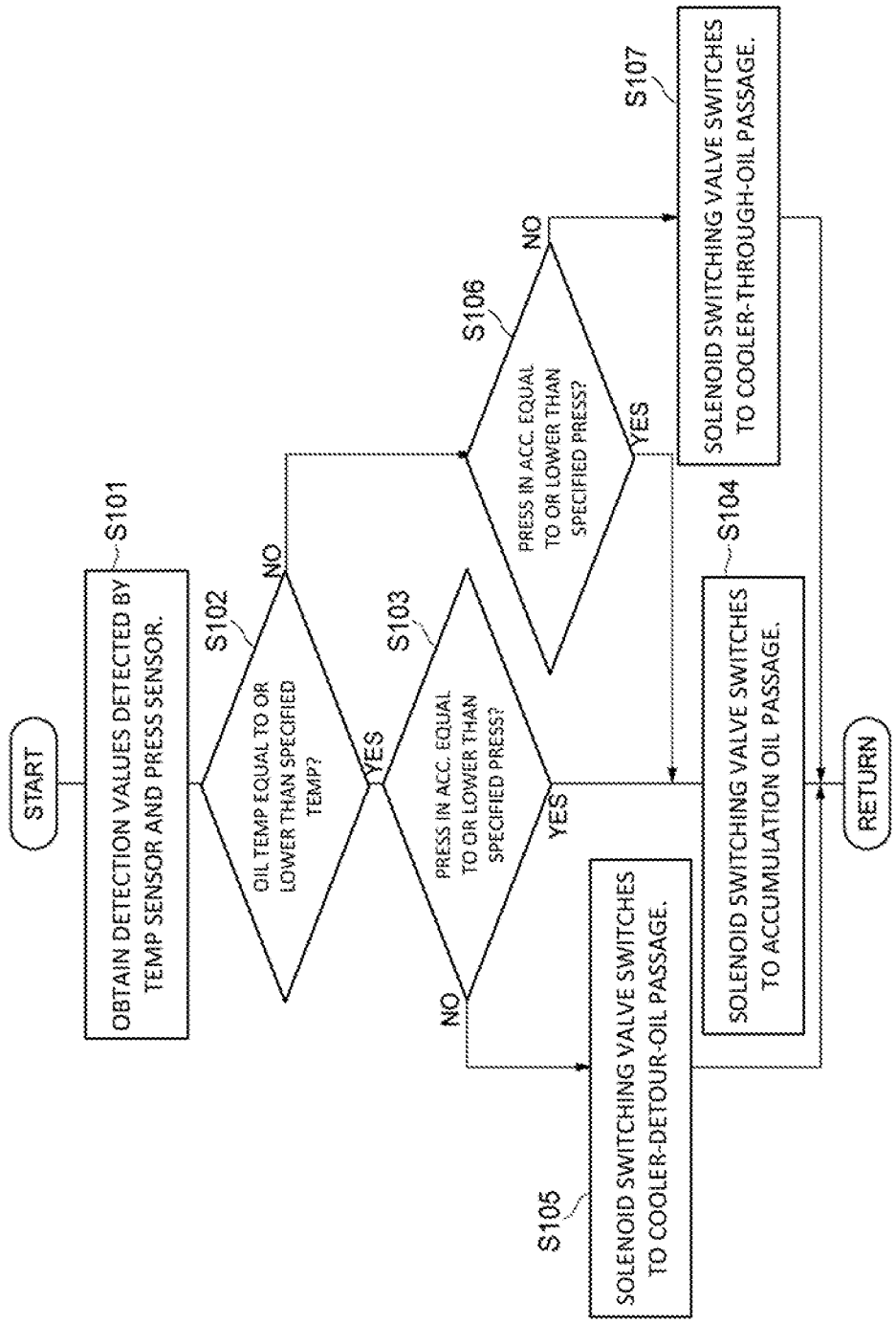
FIG. 5 is a flowchart of control process performed by a controller illustrated in FIG. 4.

FIG. 5 is a flowchart of control process performed by the controller 55. As illustrated in FIG. 5, first, the controller 55 obtains the detection values detected by the temperature sensor 53 and the pressure sensor 54 (step S101).

Next, the controller 55 judges, based on the detection value detected by the temperature sensor 53, whether the temperature of the hydraulic oil is equal to or lower than a specified temperature (step S102). The specified temperature is 10 degrees centigrade, for example. When the controller 55 judges that the temperature of the hydraulic oil is equal to or lower than the specified temperature, the controller 55 judges, based on the detection value detected by the pressure sensor 54, whether the pressure in the accumulator 17 is equal to or lower than a specified pressure (step S103). The specified pressure is, for example, a pressure enough to fill the accumulator 17 with the hydraulic oil.

When the controller 55 judges that the pressure in the accumulator 17 is equal to or lower than the specified pressure, the controller 55 controls the solenoid switching valve 50 to switch to the accumulation oil passage 50a (step S104). When the controller 55 judges that the pressure in the accumulator 17 is higher than the specified pressure, the controller 55 controls the solenoid switching valve 50 to switch to the cooler-detour-oil passage 50c (step S105).

When the controller 55 judges in step S102 that the temperature of the hydraulic oil is higher than the specified temperature, the controller 55 judges, based on the detection value detected by the pressure sensor 54, whether the pressure in the accumulator 17 is equal to or lower than the specified pressure (step S106). The specified pressure in this step is the same as the specified pressure in step S103.

When the controller 55 judges that the pressure in the accumulator 17 is equal to or lower than the specified pressure, the controller 55 controls the solenoid switching valve 50 to switch to the accumulation oil passage 50a (step S104). When the controller 55 judges that the pressure in the accumulator 17 is higher than the specified pressure, the controller 55 controls the solenoid switching valve 50 to switch to the cooler-through-oil passage 50b (step S107).

In this embodiment, as described above, when the pressure in the accumulator 17 is equal to or lower than the specified pressure, the solenoid switching valve 50 switches to the accumulation oil passage 50a, regardless of the temperature of the hydraulic oil, to cause the hydraulic oil discharged from the hydraulic pump 16 to be accumulated in the accumulator 17. When the pressure in the accumulator 17 becomes higher than the specified pressure, the solenoid switching valve 50 switches to the cooler-through-oil passage 50b or the cooler-detour-oil passage 50c to complete the accumulation of the hydraulic oil in the accumulator 17. When the brake pedal 14 is pressed, the brake valve 18 allows the supply of the hydraulic oil from the accumulator 17 to the wet-brake unit 15 to operate the wet-brake unit 15. The use of the accumulator 17 reduces the load on the hydraulic pump 16.

Figure 6:
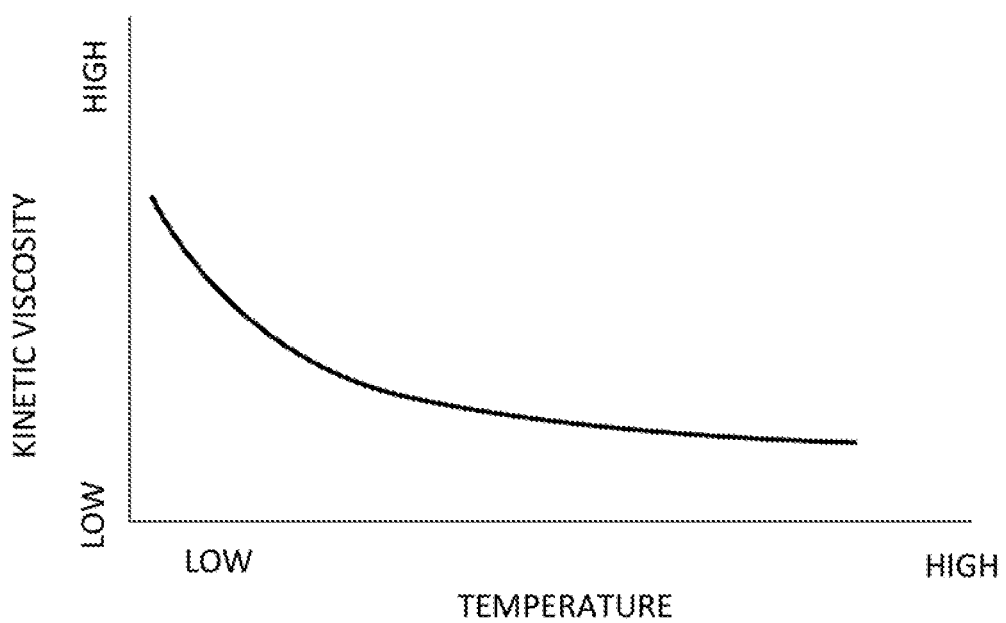
FIG. 6 is a graph showing temperature characteristics of hydraulic oil.

As illustrated in FIG. 6, the kinetic viscosity of the hydraulic oil increases as the temperature of the hydraulic oil decreases. The kinetic viscosity of the hydraulic oil is high when the hydraulic oil is at a low temperature, so that the forklift truck 2 is likely to stall or likely to decrease the loading speed of the lift cylinder 9 and the tilt cylinder 10.

In this embodiment, when the temperature of the hydraulic oil is equal to or lower than the specified temperature and the pressure in the accumulator 17 is higher than the specified pressure, the controller 55 controls the solenoid switching valve 50 to switch to the cooler-detour-oil passage 50c. The hydraulic oil discharged from the hydraulic pump 16 does not flow through the hydraulic oil cooler 19, but flows through the detour-flow passage 51 to be supplied to the wet-brake unit 15. Accordingly, the hydraulic oil discharged from the hydraulic pump 16 is not cooled in the hydraulic oil cooler 19. This allows the hydraulic oil to to be heated early when the hydraulic oil is at a low temperature, thereby reducing the length of time before the normal loading operation of the lift cylinder 9 and the tilt cylinder 10 becomes available. This therefore improves the work efficiency. This also prevents the forklift truck 2 from stalling.

In this embodiment, the three-way solenoid switching valve 50 and the cooling passage 20 are connected to each other via the detour-flow passage 51, which detours around the hydraulic oil cooler 19, but it is not limited to this configuration, and the detour-flow passage 51 does not have to be connected to the cooling passage 20. In this case, a two-way solenoid switching valve for switching between two ways may be adopted, instead of the three-way solenoid switching valve 50.

Figure 7:
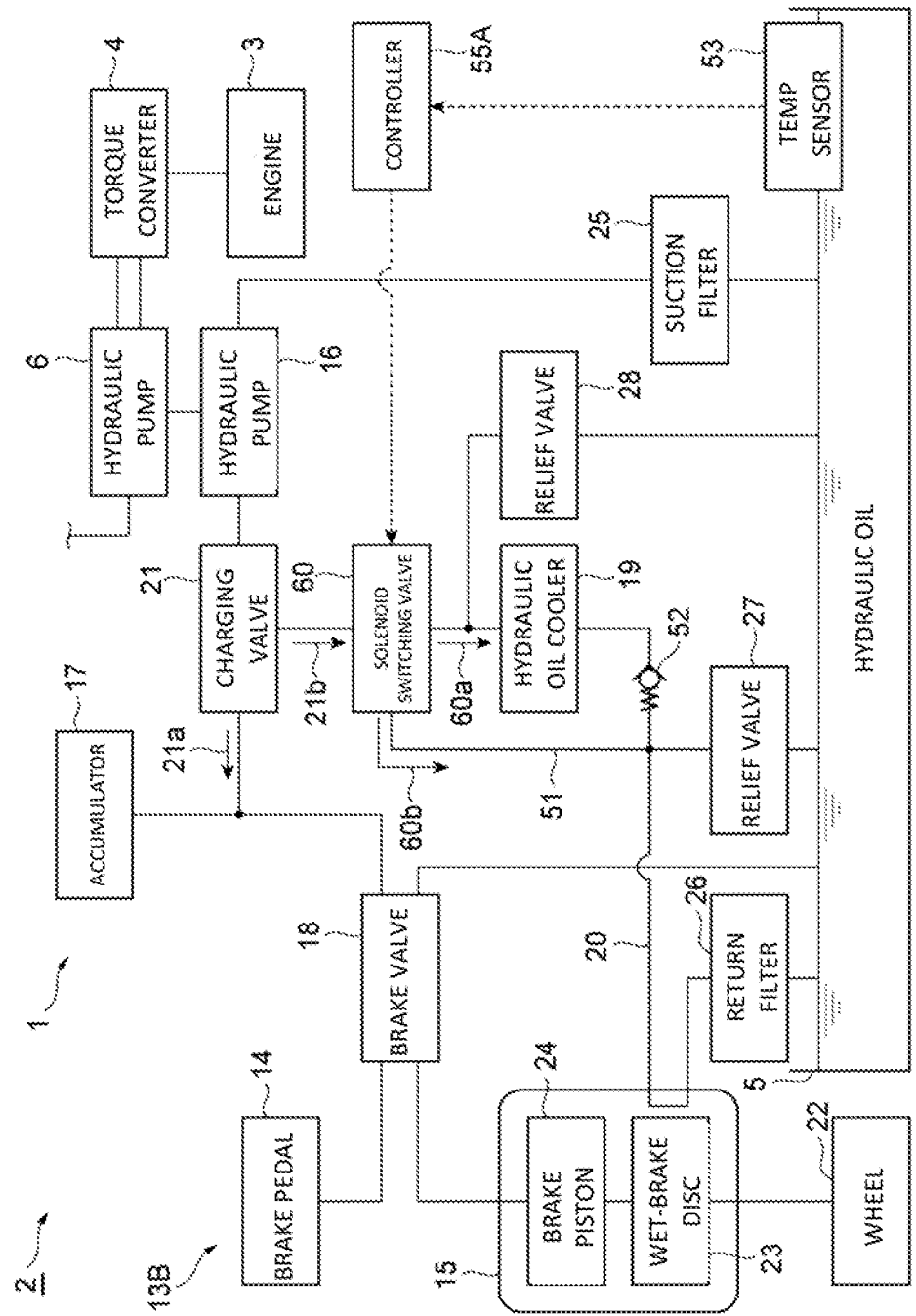
FIG. 7 is a schematic configuration diagram of a hydraulic system of an industrial vehicle according to a third embodiment of the present disclosure.

FIG. 7 is a schematic configuration diagram of a hydraulic system of an industrial vehicle according to a third embodiment of the present disclosure. As illustrated in FIG. 7, the hydraulic system 1 of this embodiment includes a brake system 13B. The brake system 13B includes a solenoid switching valve 60, in addition to the charging valve 21 of the first embodiment. The solenoid switching valve 60 is disposed between the charging valve 21 and the wet-brake unit 15. Similar to the second embodiment, the brake system 136 includes the detour-flow passage 51, which detours around the hydraulic oil cooler 19, and a check valve 52 that is disposed in the cooling passage 20.

The solenoid switching valve 60 is a two-way switching valve and disposed between the charging valve 21 and the hydraulic oil cooler 19. The solenoid switching valve 60 is configured to switch between a cooler-through-oil passage 60a and a cooler-detour-oil passage 60b.

The cooler-through-oil passage 60a serves as a third oil passage that allows the supply of the hydraulic oil from the hydraulic pump 16 to the hydraulic oil cooler 19 and cuts off the supply of the hydraulic oil from the hydraulic pump 16 to the detour-flow passage 51. The cooler-detour-oil passage 60b serves as a fourth oil passage that allows the supply of the hydraulic oil from the hydraulic pump 16 to the detour-flow passage 51 and cuts off the supply of the hydraulic oil from the hydraulic pump 16 to the hydraulic oil cooler 19.

The brake system 13B further includes the above-described temperature sensor 53 and a controller 55A. The controller 55A serves as a controller that is configured to control the solenoid switching valve 60 based on the detection value detected by the temperature sensor 53.

Figure 8:
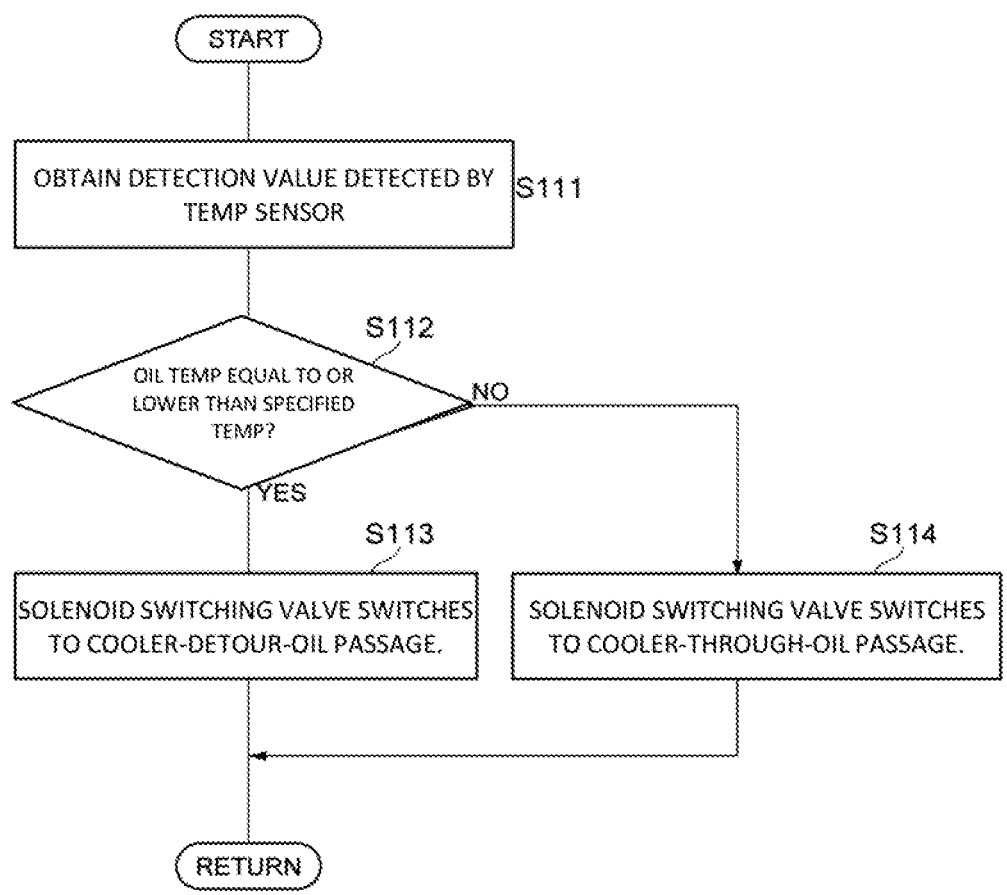
FIG. 8 is a flowchart of control process performed by a controller illustrated in FIG. 7.

FIG. 8 is a flowchart of control process performed by the controller 55A. As illustrated in FIG. 8, first, the controller 55A obtains the detection value detected by the temperature sensor 53 (step S111).

Next, the controller 55A then judges, based on the detection value detected by the temperature sensor 53, whether the temperature of the hydraulic oil is equal to or lower than the specified temperature (step S112). The specified temperature is 10 degrees centigrade, for example.

When the controller 55A judges that the temperature of the hydraulic oil is equal to or lower than the specified temperature, the controller 55A controls the solenoid switching valve 60 to switch to the cooler-detour-oil passage 60b (step S113). When the controller 55A judges that the temperature of the hydraulic oil is higher than the specified temperature, the controller 55A controls the solenoid switching valve 60 to switch to the cooler-through-oil passage 60a (step S114).

In this embodiment, as described above, when the temperature of the hydraulic oil is equal to or lower than the specified temperature, the solenoid switching valve 60 switches to the cooler-detour-oil passage 60b. The hydraulic oil discharged from the hydraulic pump 16 does not flow through the hydraulic oil cooler 19, but flows through the detour-flow passage 51 to be supplied to the wet-brake unit 15. Accordingly, the hydraulic oil discharged from the hydraulic pump 16 is not cooled in the hydraulic oil cooler 19. This allows the hydraulic oil to be heated early when the hydraulic oil is at a low temperature, thereby reducing the length of time before the normal loading operation of the lift cylinder 9 and the tilt cylinder 10 becomes available.

The present disclosure is not limited to the above-described embodiments. For example, in the above-described embodiments, the hydraulic oil cooler 19 is disposed between the solenoid switching valve 60 and the wet-brake unit 15 in the cooling passage 20, that is, upstream of the cooling passage 20 with respect to the wet-brake unit 15 (on the hydraulic pump 16 side). However, it is not limited to this, and the hydraulic oil cooler 19 may be disposed between the wet-brake unit 15 and the oil tank 5 in the cooling passage 20 or disposed in a passage, such as a passage between the brake valve 18 and the oil tank 5.

In the above-described embodiments, the charging valve 21 is configured to constantly allow the supply of the hydraulic oil from the hydraulic pump 16 to the accumulator 17, but it is not limited to this configuration. The charging valve 21 may switch between the accumulation oil passage 21a, which allows the supply of the hydraulic oil from the hydraulic pump 16 to the accumulator 17 and cuts off the supply of the hydraulic oil from the hydraulic pump 16 to the hydraulic oil cooler 19, and the cooling oil passage 21b, which allows the supply of the hydraulic oil from the hydraulic pump 16 to the hydraulic oil cooler 19 and cuts off the supply of the hydraulic oil from the hydraulic pump 16 to the accumulator 17.

In the above-described embodiment, the accumulator 17 is provided to accumulate the hydraulic oil discharged from the hydraulic pump 16, and the brake valve 18 causes the accumulator 17 to supply the hydraulic oil to the wet-brake unit 15 when the brake pedal 14 is pressed. However, it is not limited to this configuration. For example, if the accumulator 17 is not provided, the brake valve 18 may allow the supply of the hydraulic oil from the hydraulic pump 16 to the wet-brake unit 15 when the brake pedal 14 is pressed.

In the above-described embodiment, the hydraulic pumps 6, 16 are driven by the engine 3, but it is not limited to this configuration, and the hydraulic pumps 6, 16 may be driven by an electric motor. Further, only one hydraulic pump may be provided.

In the above-described embodiments, the hydraulic system 1 is mounted to the forklift truck 2, but the hydraulic system of this present disclosure is applicable to any industrial vehicle other than the forklift truck as long as such industrial vehicle includes a loading actuator for performing loading.

What is claimed is:

1. A hydraulic system of an industrial vehicle including a loading actuator and a brake unit that are driven by hydraulic oil, the hydraulic system of an industrial vehicle comprising:
   an oil tank in which the hydraulic oil is retained;
   a first hydraulic pump and a second hydraulic pump, wherein each of the first hydraulic pump and the second hydraulic pump is configured to draw in the hydraulic oil from the oil tank, wherein the first hydraulic pump is configured to supply the hydraulic oil to the loading actuator and the second hydraulic pump is configured to supply the hydraulic oil to the brake unit;
   a control valve configured to control the hydraulic oil supplied from the first hydraulic pump to the loading actuator;
   a brake valve configured to control the hydraulic oil supplied from the second hydraulic pump to the brake unit according to an operation of a brake operation tool;
   a hydraulic oil cooler configured to cool the hydraulic oil;
   a cooling passage that allows the hydraulic oil to flow from the hydraulic oil cooler to the brake unit; and
   a switching valve configured to switch between a first oil passage so as to cut off a supply of the hydraulic oil from the second hydraulic pump to the cooling passage and a second oil passage so as to allow the supply of the hydraulic oil from the second hydraulic pump to the cooling passage.

2. The hydraulic system of an industrial vehicle according to claim 1, wherein
the hydraulic system further includes an accumulator that is configured to accumulate the hydraulic oil discharged from the second hydraulic pump,
the brake valve is configured to control the hydraulic oil supplied from the accumulator to the brake unit according to the operation of the brake operation tool,
the switching valve is disposed between the second hydraulic pump and the accumulator,
the switching valve allows the supply of the hydraulic oil from the second hydraulic pump to the accumulator via the first oil passage and cuts off the supply of the hydraulic oil from the second hydraulic pump to the cooling passage, and
the switching valve allows the supply of the hydraulic oil from the second hydraulic pump to the cooling passage via the second cooling passage when a pressure in the accumulator is equal to or higher than a set pressure.

3. The hydraulic system of an industrial vehicle according to claim 1, wherein
the hydraulic system further includes:
an accumulator configured to accumulate the hydraulic oil discharged from the second hydraulic pump;
a pressure detector configured to detect a pressure in the accumulator; and
a controller configured to control the switching valve based on the pressure in the accumulator detected by the pressure detector,
the brake valve is configured to control the hydraulic oil that is supplied from the accumulator to the brake unit according to the operation of the brake operation tool,
the switching valve is a solenoid switching valve and disposed between the second hydraulic pump and the accumulator,
the switching valve allows the supply of the hydraulic oil from the second hydraulic pump to the accumulator via the first oil passage and cuts off the supply of the hydraulic oil from the hydraulic pump to the cooling passage,
the switching valve cuts off the supply of the hydraulic oil from the hydraulic pump to the accumulator via the first oil passage and allows the supply of the hydraulic oil from the second hydraulic pump to the cooling passage, and
the controller controls the solenoid switching valve to switch to the first oil passage when the pressure in the accumulator detected by the pressure detector is equal to or lower than a specified pressure, and controls the solenoid switching valve to switch to the second oil passage when the pressure in the accumulator detected by the pressure detector is higher than the specified pressure.

4. The hydraulic system of an industrial vehicle according to claim 3, wherein
the hydraulic system further includes a temperature detector configured to detect a temperature of the hydraulic oil,
the hydraulic oil cooler is disposed between the solenoid switching valve and the brake unit in the cooling passage,
the solenoid switching valve is connected to a part of the cooling passage between the hydraulic oil cooler and the brake unit by a detour-flow passage that detours around the hydraulic oil cooler,
the solenoid switching valve allows the supply of the hydraulic oil from the second hydraulic pump to the accumulator via the first oil passage and cuts off the supply of the hydraulic oil from the second hydraulic pump to the hydraulic oil cooler and the detour-flow passage,
the solenoid switching valve allows the supply of the hydraulic oil from the second hydraulic pump to the hydraulic oil cooler via the first second passage and cuts off the supply of the hydraulic oil from the second hydraulic pump to the accumulator and the detour-flow passage,
the hydraulic system further includes a cooler-detour oil passage, and the solenoid switching valve switches between the first oil passage, the second oil passage, and the cooler-detour oil passage that allows the supply of the hydraulic oil from the second hydraulic pump to the detour-flow passage and cuts off the supply of the hydraulic oil from the second hydraulic pump to the accumulator and the hydraulic oil cooler, and
the controller controls the solenoid switching valve to switch to the cooler-detour oil passage when the temperature of the hydraulic oil detected by the temperature detector is equal to or lower than a specified temperature and the pressure in the accumulator detected by the pressure detector is higher than the specified pressure, controls the solenoid switching valve to switch to the second oil passage when the temperature of the hydraulic oil detected by the temperature detector is higher than the specified temperature and the pressure in the accumulator detected by the pressure detector is higher than the specified pressure, and controls the solenoid switching valve to switch to the first oil passage regardless of the temperature of the hydraulic oil detected by the temperature detector when the pressure in the accumulator detected by the pressure detector is equal to or lower than the specified pressure.

5. The hydraulic system of an industrial vehicle according to claim 1, wherein
the hydraulic system further includes:
an accumulator configured to accumulate the hydraulic oil discharged from the second hydraulic pump;
a solenoid switching valve disposed between the switching valve and the brake unit;
a temperature detector configured to detect a temperature of the hydraulic oil; and
a controller configured to control the solenoid switching valve based on the temperature of the hydraulic oil detected by the temperature detector,
the brake valve is configured to control the hydraulic oil supplied from the accumulator to the brake unit according to the operation of the brake operation tool,
the hydraulic oil cooler is disposed between the solenoid switching valve and the brake unit in the cooling passage,
the solenoid switching valve is connected to a part of the cooling passage between the hydraulic oil cooler and the brake unit by a detour-flow passage that detours around the hydraulic oil cooler,
the first oil passage allows the supply of the hydraulic oil from the second hydraulic pump to the accumulator and cuts off the supply of the hydraulic oil from the second hydraulic pump to the cooling passage,
the second oil passage allows the supply of the hydraulic oil from the second hydraulic pump to the cooling passage when a pressure in the accumulator is equal to or higher than a set pressure, the solenoid switching valve is configured to switch between a third oil passage so as to allow the supply of the hydraulic oil from the second hydraulic pump to the hydraulic oil cooler and to cut off the supply of the hydraulic oil from the second hydraulic pump to the detour-flow passage and a fourth oil passage so as to allow the supply of the hydraulic oil from the second hydraulic pump to the detour-flow passage and to cut off the supply of the hydraulic oil from the second hydraulic pump to the hydraulic oil cooler, and the controller controls the solenoid switching valve to switch to the fourth oil passage when the temperature of the hydraulic oil detected by the temperature detector is equal to or lower than a specified temperature, and controls the solenoid switching valve to switch to the third oil passage when the temperature of the hydraulic oil detected by the temperature detector is higher than the specified temperature.

\* \* \* \* \*